US008309039B2

(12) United States Patent
Webster et al.

(10) Patent No.: US 8,309,039 B2
(45) Date of Patent: Nov. 13, 2012

(54) VALVE STRUCTURE FOR CONSISTENT VALVE OPERATION OF A MINIATURIZED FLUID DELIVERY AND ANALYSIS SYSTEM

(76) Inventors: James Russell Webster, Hsinchu (TW); Shaw-Tzu Wang, Taipei (TW); Ko-Yuan Tseng, Hsinchu (TW)

(*) Notice: Subject to any disclaimer, the term of this patent is extended or adjusted under 35 U.S.C. 154(b) by 74 days.

(21) Appl. No.: 12/822,597

(22) Filed: Jun. 24, 2010

(65) Prior Publication Data

US 2010/0261193 A1 Oct. 14, 2010

Related U.S. Application Data

(60) Continuation-in-part of application No. 12/650,479, filed on Dec. 30, 2009, now abandoned, which is a continuation of application No. 11/504,303, filed on Aug. 15, 2006, now Pat. No. 7,666,687, which is a division of application No. 10/437,046, filed on May 14, 2003, now Pat. No. 7,241,421.

(51) Int. Cl.
*F16K 15/00* (2006.01)

(52) U.S. Cl. ........... 422/537; 422/541; 436/43; 137/511

(58) Field of Classification Search .................. 422/502, 422/504, 537, 541, 81; 436/43, 180; 435/287.1, 435/287.3; 137/511

See application file for complete search history.

(56) References Cited

U.S. PATENT DOCUMENTS

| | | | | |
|---|---|---|---|---|
| 5,975,485 | A * | 11/1999 | Tsai et al. | 251/11 |
| 6,521,188 | B1 * | 2/2003 | Webster | 422/504 |
| 6,527,003 | B1 * | 3/2003 | Webster | 137/15.18 |
| 6,767,194 | B2 * | 7/2004 | Jeon et al. | 417/559 |
| 7,241,421 | B2 * | 7/2007 | Webster et al. | 422/503 |
| 7,607,641 | B1 * | 10/2009 | Yuan | 251/331 |
| 7,666,687 | B2 * | 2/2010 | Webster et al. | 436/180 |
| 7,981,386 | B2 * | 7/2011 | Mcavoy et al. | 422/538 |
| 2002/0098097 | A1 * | 7/2002 | Singh | 417/413.1 |
| 2006/0245933 | A1 * | 11/2006 | Balch et al. | 417/182 |

OTHER PUBLICATIONS

Tai et al. Analytical Biochemistry, vol. 391, May 12, 2009, pp. 98-105.*

* cited by examiner

*Primary Examiner* — Maureen Wallenhorst
(74) *Attorney, Agent, or Firm* — Alexander Chen, Esq.

(57) ABSTRACT

A valve structure of a fluid delivery and analysis system having an upper substrate, a lower substrate and an intermediate layer with at least one opening and at least one open cavity having a first touch point between the upper substrate and the intermediate layer and a second touch point between the lower substrate and the intermediate layer where the first touch point and the second touch point are offset to create a torque so that when intermediate layer is compressed between the upper substrate and the lower substrate that the torque deforms the intermediate rubber layer in the direction of the opening for better sealing.

4 Claims, 4 Drawing Sheets

VALVE STRUCTURE FOR CONSISTENT VALVE OPERATION OF A MINIATURIZED FLUID DELIVERY AND ANALYSIS SYSTEM

CROSS REFERENCE TO RELATED APPLICATIONS

This application is a Continuation In Part (CIP) of U.S. utility patent application Ser. No. 12/650,479 filed on Dec. 30, 2009, now abandoned, which is a Continuation of U.S. utility patent application Ser. No. 11/504,303 filed on Aug. 15, 2006, which is now a issued U.S. Pat. No. 7,666,687 which is a divisional application of Ser. No. 10/437,046 filed on May 14, 2003 which is now a issued U.S. Pat. No. 7,241,421, the disclosures of which are incorporated herein by reference.

FIELD OF THE INVENTION

This invention relates to a system comprising a fluid delivery and analysis cartridge and an external linear actuator. More particularly, the invention relates to a system for carrying out various processes, including screening, immunological diagnostics, DNA diagnostics, in a miniature fluid delivery and analysis cartridge.

Recently, highly parallel processes have been developed for the analysis of biological substances such as, for example, proteins and DNA. Large numbers of different binding moieties can be immobilized on solid surfaces and interactions between such moieties and other compounds can be measured in a highly parallel fashion. While the sizes of the solid surfaces have been remarkably reduced over recent years and the density of immobilized species has also dramatically increased, typically such assays require a number of liquid handling steps that can be difficult to automate without liquid handling robots or similar apparatuses.

A number of microfluidic platforms have recently been developed to solve such problems in liquid handling, reduce reagent consumptions, and to increase the speed of such processes. Examples of such platforms are described in U.S. Pat. Nos. 5,856,174 and 5,922,591. Such a device was later shown to perform nucleic acid extraction, amplification and hybridization on HIV viral samples as described by Anderson et al, “Microfluidic Biochemical Analysis System”, Proceeding of the 1997 International Conference on Solid-State Sensors and Actuators, Tranducers ’97, 1997, pp. 477-480. Through the use of pneumatically controlled valves, hydrophobic vents, and differential pressure sources, fluid reagents were manipulated in a miniature fluidic cartridge to perform nucleic acid analysis.

Another example of such a microfluidic platform is described in U.S. Pat. No. 6,063,589 where the use of centripetal force is used to pump liquid samples through a capillary network contained on compact-disc liquid fluidic cartridge. Passive burst valves are used to control fluid motion according to the disc spin speed. Such a platform has been used to perform biological assays as described by Kellog et al, “Centrifugal Microfluidics: Applications,” Micro Total Analysis System 2000, Proceedings of the uTas 2000 Symposium, 2000, pp. 239-242. The further use of passive surfaces in such miniature and microfluidic devices has been described in U.S. Pat. No. 6,296,020 for the control of fluid in micro-scale devices.

An alternative to pressure driven liquid handling devices is through the use of electric fields to control liquid and molecule motion. Much work in miniaturized fluid delivery and analysis has been done using these electro-kinetic methods for pumping reagents through a liquid medium and using electrophoretic methods for separating and perform specific assays in such systems. Devices using such methods have been described in U.S. Pat. No. 4,908,112, U.S. Pat. No. 6,033,544, and U.S. Pat. No. 5,858,804.

Other miniaturized liquid handling devices have also been described using electrostatic valve arrays (U.S. Pat. No. 6,240,944), Ferrofluid micropumps (U.S. Pat. No. 6,318,970), and a Fluid Flow regulator (U.S. Pat. No. 5,839,467).

The use of such miniaturized liquid handling devices has the potential to increase assay throughput, reduce reagent consumption, simplify diagnostic instrumentation, and reduce assay costs. The present invention also relates to a valve structure for consistent operation, especially in miniaturized analysis cartridges.

BACKGROUND OF THE INVENTION

The system of the invention comprises a plastic fluidic device having at least one reaction chamber connected to pumping structures through capillary channels and external linear actuators. The device comprises two plastic substrates, a top substrate and a bottom substrate containing capillary channel(s), reaction chamber(s), and pump/valve chamber (s)—and a flexible intermediate interlayer between the top and bottom substrate which provides providing a sealing interface for the fluidic structures as well as valve and pump diaphragms. Passive check valve structures are formed in the three layer device by providing a means for a gas or liquid to flow from a channel in the lower substrate to a channel in the upper substrate by the bending of the interlayer diaphragm. Furthermore flow in the opposite direction is controlled by restricting the diaphragm bending motion with the lower substrate. Alternatively check valve structures can be constructed to allow flow from the top substrate to the bottom substrate by flipping the device structure. Pump structures are formed in the device by combining a pump chamber with two check valve structures operating in the same direction. A hole is also constructed in the lower substrate corresponding to the pump chamber. A linear actuator—external to the plastic fluidic device—can then be placed in the hole to bend the pump interlayer diaphragm and therefore provide pumping action to fluids within the device. Such pumping structures are inherently unidirectional.

In one embodiment the above system can be used to perform immunoassays by pumping various reagents from an inlet reservoir, through a reaction chamber containing a plurality of immobilized antibodies or antigens, and finally to an outlet port. In another embodiment the system can be used to perform assays for DNA analysis such as hybridization to DNA probes immobilized in the reaction chamber. In still another embodiment the device can be used to synthesize a series of oligonucleotides within the reaction chamber. While the system of the invention is well suited to perform solid-phase reactions within the reaction chamber and provide the means of distributing various reagents to and from the reaction chamber, it is not intended to be limited to performing solid-phase reactions only.

The system of the invention is also well suited for disposable diagnostic applications. The use of the system can reduce the consumables to only the plastic fluidic cartridge and eliminate any cross contamination issues of using fixed-tipped robotic pipettes common in high-throughput applications.

U.S. Pat. No. 7,241,421 describes a miniaturized analysis cartridge comprised of three layers, which incorporates unidirectional valves and uni-directional pumps. An injection molded layer of silicone rubber is inserted between two injection molded substrates. The silicone rubber layer serves several purposes. First, it serves as a flexible valve seat for the uni-directional valve. Second, it serves as a flexible pump membrane that is actuated by an external linear actuator. Third, it serves as a soft, compressible layer to seal the entire microfluidic network, including pumps, valves, microchannels, and reservoirs. The two injection molded substrates are compressed and heat staked in order to form a leak-free seal.

However, valves as described in U.S. Pat. No. 7,241,421 have a very limited working range due to the compression of the sealing process. A torque develops in the valve seat due to compression of the rubber, which causes the valve to open. Therefore, valves as described in U.S. Pat. No. 7,241,421 do not achieve a leak-free seal while performing consistently.

A need for a valve which closes instead of opens upon compression of the rubber due to the sealing process arose. Such an invention would render achievement of both an effective seal and an operational valve mutually inclusive over a reasonable process range and would enable consistent production of devices similar to U.S. Pat. No. 7,241,421. The present invention describes such a valve structure that allows for consistent valve operation over a compression range of 30-100 microns.

OBJECT OF THE INVENTION

Objectives of the present invention include improving the consistency, reliability, and manufacturability of biological immunoassay cartridges through superior valve construction. The objective of improved reliability and manufacturability of the biological analysis cartridge is achieved by maintaining the valve constantly closed, eliminating alignment problems, eliminating sticking, and expanding the valve operational capacity over a wider heat staking range. The objective of reducing bubbles is achieved by reducing valve volumes, eliminating trapped air, and optimizing the solenoid drive.

SUMMARY OF THE INVENTION

The system of the invention comprises a plastic fluidic device having at least one reaction chamber connected to pumping structures through capillary channels and external linear actuators. The device comprises two plastic substrates, a top substrate and a bottom substrate containing capillary channel(s), reaction chamber(s), and pump/valve chamber (s)—and a flexible intermediate interlayer between the top and bottom substrate which provides providing a sealing interface for the fluidic structures as well as valve and pump diaphragms. Passive check valve structures are formed in the three layer device by providing a means for a gas or liquid to flow from a channel in the lower substrate to a channel in the upper substrate by the bending of the interlayer diaphragm. Furthermore flow in the opposite direction is controlled by restricting the diaphragm bending motion with the lower substrate. Alternatively check valve structures can be constructed to allow flow from the top substrate to the bottom substrate by flipping the device structure. Pump structures are formed in the device by combining a pump chamber with two check valve structures operating in the same direction. A hole is also constructed in the lower substrate corresponding to the pump chamber. A linear actuator—external to the plastic fluidic device—can then be placed in the hole to bend the pump interlayer diaphragm and therefore provide pumping action to fluids within the device. Such pumping structures are inherently unidirectional.

In one embodiment the above system can be used to perform immunoassays by pumping various reagents from an inlet reservoir, through a reaction chamber containing a plurality of immobilized antibodies or antigens, and finally to an outlet port. In another embodiment the system can be used to perform assays for DNA analysis such as hybridization to DNA probes immobilized in the reaction chamber. In still another embodiment the device can be used to synthesize a series of oligonucleotides within the reaction chamber. While the system of the invention is well suited to perform solid-phase reactions within the reaction chamber and provide the means of distributing various reagents to and from the reaction chamber, it is not intended to be limited to performing solid-phase reactions only.

The system of the invention is also well suited for disposable diagnostic applications. The use of the system can reduce the consumables to only the plastic fluidic cartridge and eliminate any cross contamination issues of using fixed-tipped robotic pipettes common in high-throughput applications.

In another embodiment, the invention has been devised in view of the circumstances and it is the object of the invention, among others, to provide improved consistency, reliability, and manufacturability of biological immunoassay cartridges by maintaining consistent valve operation over a compression range of 30-100 microns. This feat is achieved by placing critical alignment within the same rubber part, which creates a valve containing an upper and lower cavity in the rubber and eliminates all alignment effects on the valve. Furthermore, touch points on the upper and lower substrates are offset in the direction of valve closure. This offset of touch points creates a torque when the rubber is compressed between the upper and lower substrate and deforms the rubber in the direction of the outer touch point. The offset distance between touch points influences the magnitude of the deforming force. This holds true until a critical compression point in the rubber is reached and valve seat inverts and buckles in the opposite direction.

The invention has been devised to prevent sticking issues through creation of a minimally-sized valve seat. Silicone rubber on smooth surfaces is problematic and leads to sticking, which would require a higher than normal pressure to initially open the valve.

Specially, a valve structure of a fluid delivery and analysis system is disclosed, wherein the valve structure is comprised of an upper substrate, a lower substrate and an intermediate layer wherein the intermediate layer is comprised of at least one opening and at least one open cavity. In one embodiment, the intermediate layer contains an open cavity on its upper surface and an open cavity on its lower surface. In one embodiment a first touch point is provided between the upper substrate and the intermediate layer and a second touch point is provided between the lower substrate and the intermediate layer wherein the first touch point and the second touch point are offset to create a torque when the intermediate layer is compressed between the upper substrate and the lower substrate wherein the torque deforms the intermediate rubber layer in the direction of the opening. In one embodiment the open cavity is located between the opening and the first touch point and the second touch point. In one embodiment the intermediate layer is rubberized.

In another aspect of the invention, a method to provide a valve structure of a fluid delivery and analysis system comprising, providing an upper substrate, providing a lower substrate, providing an intermediate layer comprising at last one opening and at least an open cavity. In one embodiment the intermediate layer contains an open cavity on its upper surface and an open cavity on its lower surface. In one embodiment a first touch point is provided between the upper substrate and the intermediate layer and a second touch point is provided between the lower substrate and the intermediate layer wherein the first touch point and the second touch point are offset to create a torque when the intermediate layer is compressed between the upper substrate and the lower substrate wherein the torque deforms the intermediate rubber layer in the direction of the opening. In one embodiment the open cavity is located between the opening and the first touch point and the second touch point. In one embodiment the intermediate layer is rubberized.

In another aspect of the invention, a method of performing immunological assay of a fluid sample, wherein the method comprises the steps of: (a) pumping the fluid sample from a fluid reservoir, where the fluid sample is placed therein, to a reaction chamber, wherein the fluid reservoir and the reaction chamber are defined in a fluidic cartridge and the reaction chamber comprises therein a plurality of immobilized species; (b) allowing the fluid sample to react with the plurality of immobilized species for a predetermined reaction time; and (c) excluding the fluid sample from the reaction chamber through an exit port wherein the fluid reservoir, the reaction chamber and the exit port are connected by one or more channels of capillary dimensions, wherein the fluidic cartridge includes a first substrate, a second substrate and an flexible intermediate interlayer sealedly interfaced between the first substrate and the second substrate to form therein the fluid reservoir, the one or more channels, the reaction chamber, and the exit port, and wherein the fluidic cartridge further provides a fluid flow controlling structure therein to restrict a flow of the fluid sample through the reaction chamber via the one or more channels in one direction only wherein in the steps (a) and (c) wherein the fluid flow controlling structure comprises the flexible intermediate interlayer comprising at least one opening and at least one open cavity, a linear actuator provides a pumping action in a pump chamber defined in the fluidic cartridge so as to pump the fluid sample to flow from the fluid reservoir to the exit port through the reaction chamber and the one or more channels. In one embodiment the fluid flow controlling structure comprising the flexible intermediate interlayer comprising an open cavity on its upper surface and an open cavity on its lower surface. In one embodiment a first touch point is provided between the upper substrate and the intermediate layer and a second touch point is provided between the lower substrate and the intermediate layer wherein the first touch point and the second touch point are offset to create a torque when the intermediate layer is compressed between the upper substrate and the lower substrate wherein the torque deforms the intermediate rubber layer in the direction of the opening. In one embodiment the open cavity is located between the opening and the first touch point and the second touch point. In one embodiment the intermediate layer is rubberized.

In yet another aspect of the invention, a fluid delivery and analysis system, comprising: a fluidic cartridge including a first substrate, a second substrate and a flexible intermediate interlayer sealedly interfaced between the first substrate and the second substrate to form therein one or more channels of capillary dimensions within the first substrate and the second substrate on both sides of flexible intermediate interlayer; a fluid reservoir, a pump chamber, a reaction chamber, and a port formed at least partially in the first substrate or the second substrate of the fluidic cartridge, and wherein the one or more channels connect the fluid reservoir to the pump chamber, the pump chamber to the reaction chamber, and the reaction chamber to the port; a fluid flow controlling structure, formed in the fluidic cartridge, restricting a flow of a fluid in only a direction from the fluid reservoir to the reaction chamber via the one or more channels and the pump chamber wherein the fluid flow controlling structure comprises the flexible intermediate interlayer comprising at least one opening and at least one open cavity; and a linear actuator providing a pumping action in the pump chamber to push the fluid to flow from the fluid reservoir to the reaction chamber via the pump chamber and the one or more channels. In one embodiment the fluid flow controlling structure comprising the flexible intermediate interlayer comprising an open cavity on its upper surface and an open cavity on its lower surface.

DETAILED DESCRIPTION OF THE EMBODIMENTS

Figure 1A:
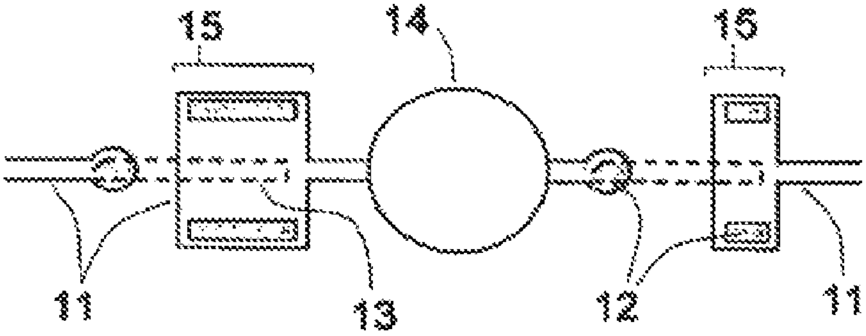
FIG. 1A is a top view of a pump structure within the plastic fluidic device of the invention.
Figure 1B:
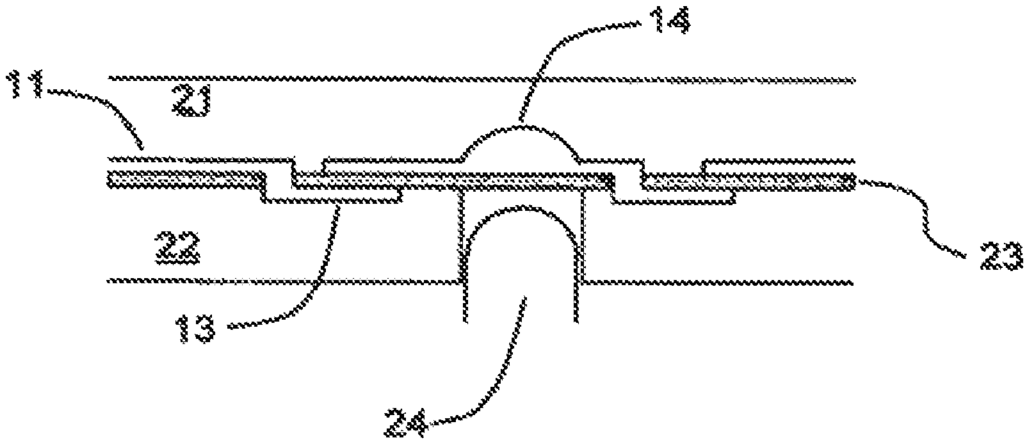
FIG. 1B is a cross section view of the pump structure within the plastic fluidic device of the invention.

The system of the invention comprises a plastic fluidic cartridge and a linear actuator system external to the fluidic cartridge. FIG. 1A shows a cross-sectional view of a pump structure formed within the fluidic cartridge of the invention. The plastic fluidic cartridge comprises three primary layers: an upper substrate 21, a lower substrate 22, and a flexible intermediate interlayer 23, as shown in FIG. 1B. The three layers can be assembled by various plastic assembly methods such as, for example, screw assembly, heat staking, ultrasonic bonding, clamping, or suitable reactive/adhesive bonding methods. The upper and lower substrates, depicted as 21 and 22 in FIG. 1B, both contain a variety of features that define channels of capillary dimensions as well as pump chambers, valve chambers, reaction chambers, reservoirs, and inlet/outlet ports within the cartridge. FIG. 1B shows a top view of the pump structure of FIG. 1A. The pump is defined by a pump chamber 14 and two passive check valves 15 that provide a high resistance to flow in one direction only. Passive check valves 15 comprise a lower substrate channel 13 and an upper substrate channel 11 separated by interlayer 23 such that holes through interlayer 23, depicted as holes 12 in FIG. 1B, are contained within upper substrate channel 11 but not within lower substrate channel 13. Such check valve structures provide a low resistance to a gas/liquid flowing from lower substrate channel 13 to upper substrate channel 11 and likewise provide a high resistance to a gas/liquid flowing from upper substrate channel 11 to lower substrate channel 13. Pump chamber 14 comprises an upper substrate chamber and a hole 141 in lower substrate 22 to free interlayer 23 to act as a diaphragm 25, as depicted in FIG. 1B. A linear actuator 24 external to the fluidic cartridge can then be placed in the hole

131 to bend diaphragm 25 and therefore provide the necessary force to deform the diaphragm.

Figure 2:
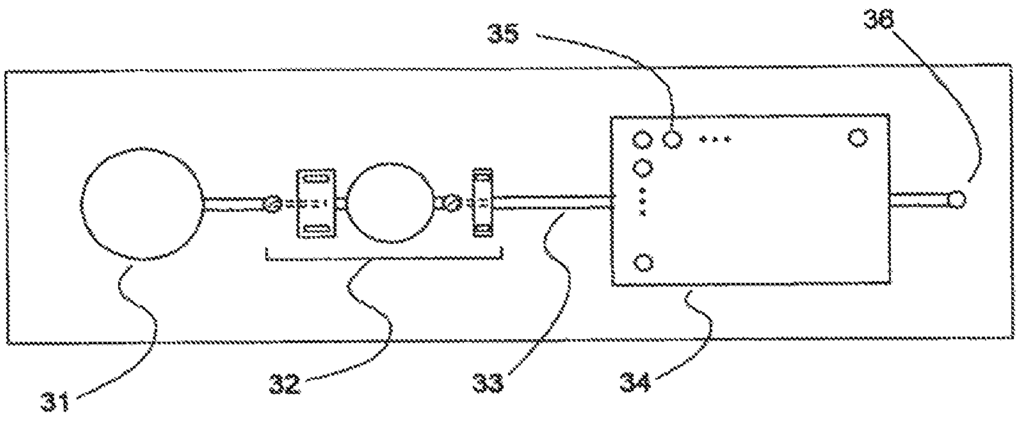
FIG. 2 is a top view of a plastic fluidic device of the invention configured as a single-fluid delivery and analysis device.

FIG. 2 shows a top view of a plastic fluidic cartridge of the invention configured as a single-fluid delivery and analysis device. Fluid is first placed into the reservoir 31 manually or automated using a pipette or similar apparatus. A pump structure 32 similar to that of FIG. 1B is contained within the device. By repeatedly actuating an external linear actuator, fluid in reservoir 31 is pumped through the pump structure 32, the capillary channel 33 and into the reaction chamber 34. Reaction chamber 34 contains a plurality of immobilized bio-molecules 35 for specific solid-phase reactions with said fluid. After a specified reaction time, the fluid is pumped through reaction chamber 34 and out the exit port 36.

Upper substrate 21 and lower substrate 22 of the plastic fluidic cartridge of the invention can be constructed using a variety of plastic materials such as, for example, polymethylmethacrylate (PMMA), polystyrene (PS), polycarbonate (PC), Polypropylene (PP), polyvinylchloride (PVC). In the case of optical characterization of reaction results within a reaction chamber, upper substrate 21 is preferably constructed out of a transparent plastic material. Capillaries, reaction chambers, and pump chambers can be formed in upper substrate 21 and lower substrate 22 using methods such as injection molding, compression molding, hot embossing, or machining. Thicknesses of upper substrate 21 and lower substrate 22 are suitably in, but not limited to, the range of 1 millimeter to 3 millimeter in thickness. Flexible interlayer 23 can be formed by a variety of polymer and rubber materials such as latex, silicone elastomers, polyvinylchloride (PVC), or fluoroelastomers. Methods for forming the features in interlayer 23 include die cutting, rotary die cutting, laser etching, injection molding, and reaction injection molding.

Linear actuator 24 of the present invention, as depicted in FIG. 1B, is preferred to be, but not limited to, an electromagnetic solenoid. Other suitable linear actuators include a motor/cam/piston configuration, a piezoelectric linear actuator, or motor/linear gear configuration.

The invention will further be described in a series of examples that describe different configurations for performing different analyses using the plastic fluidic cartridge and external linear actuator of this invention.

EXAMPLE 1

Immunological Assay

The plastic fluidic cartridge, as shown in FIG. 2, can be utilized to perform immunological assays within reaction chamber 34 by immobilizing a plurality of bio-molecules such as different antibodies 35. In one exemplary embodiment, a sample containing an unknown concentration of a plurality of antigens or antibodies is first placed within reservoir 31. The external linear actuator is then repeatedly actuated to pump the sample from reservoir 31 to reaction chamber 34. The sample is then allowed to react with the immobilized antibodies 35 for a set reaction time. At the end of the set reaction time, the sample is then excluded from reaction chamber 34 through exit port 36. A wash buffer is then placed in reservoir 31 and the external linear actuator is repeatedly actuated to pump the wash buffer through reaction chamber 34 and out the exit port 36. Such wash steps can be repeated as necessary. A solution containing a specific secondary antibody conjugated with a detectable molecule such as a peroxidase enzyme, alkaline phosphatase enzyme, or fluorescent tag is placed into reservoir 31. The secondary antibody solution is then pumped into reaction chamber 34 by repeatedly actuating the linear actuator. After a predetermined reaction time, the solution is pumped out through exit port 36. Reaction chamber 34 is then washed in a similar manner as previously describe. In the case of an enzyme conjugate, a substrate solution is placed into reservoir 31 and pumped into reaction chamber 34. The substrate will then react with any enzyme captured by the previous reactions with the immobilized antibodies 35 providing a detectable signal. For improved assay performance, reaction chamber 34 can be maintained at a constant 37.degree. C.

Figure 3:
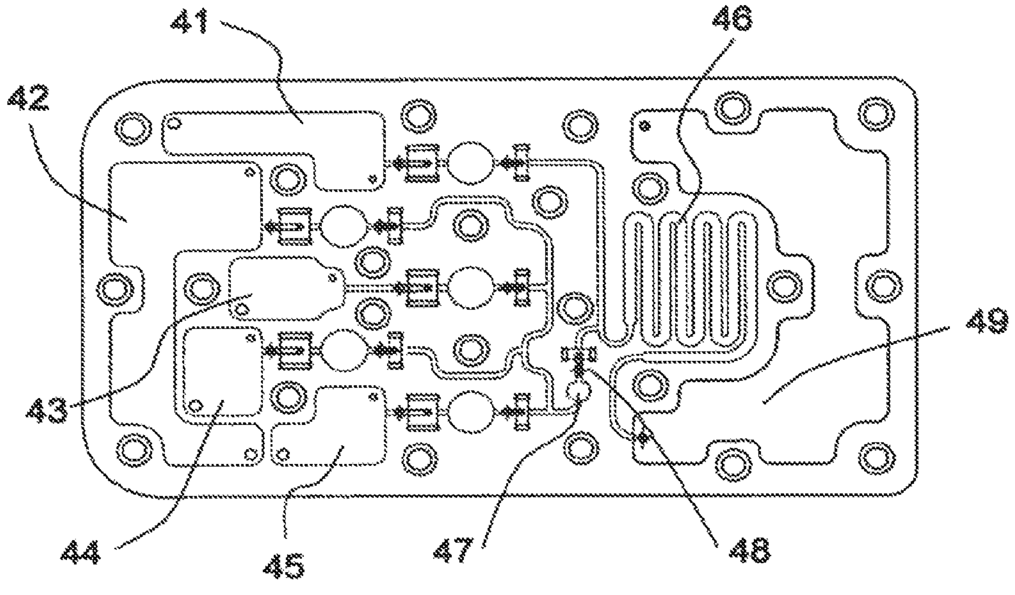
FIG. 3 is a top view of a plastic fluidic device of the invention configured as a 5-fluid delivery and analysis device.

According to the present invention, the plastic fluidic cartridge need not be configured as a single-fluid delivery and analysis device. FIG. 3 shows a plastic cartridge configured as a five fluid delivery and analysis device. Such a device can perform immunological assays, such as competitive immunoassay, immunosorbent immunoassay, immunometric immunoassay, sandwich immunoassay and indirect immunoassay, by providing immobilized antibodies in reaction chamber 46. Here reaction chamber 46 is not configured as a wide rectangular area, but a serpentine channel of dimensions similar to capillary dimension. This configuration provides more uniform flow through the reaction chamber at the expense of wasted space. For example, during immunoassays, a sample containing unknown concentrations of a plurality of antigens or antibodies is placed in reservoir 41. A wash buffer is placed in reservoir 42. Reservoir 43 remains empty to provide air purging. A substrate solution specific to the secondary antibody conjugate is placed in reservoir 44. The secondary antibody conjugate is placed in reservoir 45. Each reservoir is connected to a pump structure 1' similar to that of FIG. 1. Pump structures 1' provide pumping from reservoirs 41, 42, 43, 44, and 45 through reaction chamber 46 to a waste reservoir 49. A secondary reaction chamber 47 is provided for negative control and is isolated from the sample of reservoir 41 by check valve 48. The protocol for performing immunoassays in this device is equivalent to that described previously for the single-fluid configuration with the distinct difference that each separated reagent is contained in a separate reservoir and pumped with a separate pump structure using a separate external linear actuator. First, an external linear actuator corresponding to a pump connected to reservoir 41 is repeatedly actuated until a sample fluid fills reaction chamber 46. After a predetermined reaction time, the sample fluid is pumped to waste reservoir 49 using either a pump connected to sample reservoir 41 or a pump connected to air purge reservoir 43. Next the wash buffer is pumped into reaction chamber 46 by repeatedly actuating the external actuator corresponding to a pump structure connected to wash reservoir 42. The wash and/or air purge cycle can be repeated as necessary. A secondary antibody solution is then pumped into reaction chamber 46 by repeatedly actuating the external linear actuator corresponding to a pump structure connected to reservoir 45. After a predetermined reaction time, the secondary antibody solution is excluded from reaction chamber 46 either by a pump connected to reservoir 45 or a pump connected to air purge reservoir 43. Reaction chamber 46 is then washed as before. The substrate is pumped into reaction chamber 46 by repeatedly actuating a linear actuator corresponding to a pump connected to reservoir 44. After a predetermined reaction time, the substrate is excluded from reaction chamber 46 and replaced with wash buffer from reservoir 42. Results of the immunoassay can then be confirmed by optical measurements through upper substrate 21.

Figure 4:
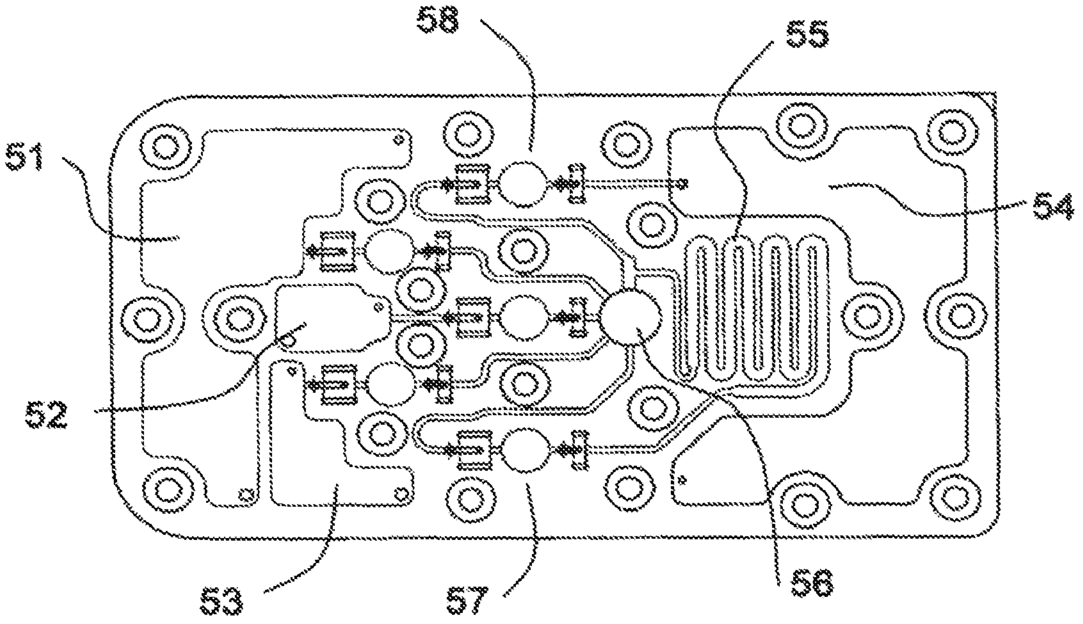
FIG. 4 is a top view of a plastic fluidic device of the invention configured as a re-circulating 3-fluid delivery and analysis device.

Furthermore, the reactions performed with the plastic fluidic cartridge of the invention need not be limited to reactions performed in stationary liquids. FIG. 4 shows a plastic fluidic cartridge according to the invention, configured to provide continuous fluid motion through reaction chamber 55. In this configuration, reservoirs 51, 52, and 53 are connected to separate pump structures similar to those of the five fluid configuration of FIG. 3, but in this case the pump structures are connected to an intermediate circulation reservoir 56. For example, pump structure 57 is connected to circulation reservoir 56 to provide continuous circulation of fluid from circulation reservoir 56 through reaction chamber 55 and returning to circulation reservoir 56. In this manner, a fluid can be circulated through reaction chamber 55 without stopping. Such a fluid motion can provide better mixing, faster reactions times, and complete sample reaction with immobilized species in reaction chamber 55. Pump structure 58 is connected such that it provides pumping of fluids from circulation reservoir 56 to waste reservoir 54. Immunological assays similar to those described above can be performed in this device by immobilizing antibodies in reaction chamber 55 placing the sample containing unknown concentrations of antigens or antibodies in the circulation reservoir 56, placing a solution of secondary antibody conjugate in reservoir 52, placing a substrate solution in reservoir 53, and placing a wash buffer in reservoir 51. The remaining protocol is identical to the above method with the addition of transferring fluids to and from the circulation reservoir 56 and continuously circulating during all reaction times.

EXAMPLE 2

DNA Hybridization

The system of the present invention can also be used to perform DNA hybridization analysis. Using the plastic cartridge of FIG. 4, a plurality of DNA probes are immobilized in reaction chamber 55. A sample containing one or more populations of fluorescently tagged, amplified DNA of unknown sequence is placed in reservoir 52. A first stringency wash buffer is placed in reservoir 51. A second stringency wash buffer is placed in reservoir 53. Reaction chamber 55 is maintained at a constant temperature of 52.degree. C. The sample is transferred to circulation reservoir 56 by repeatedly actuating a linear actuator corresponding to a pump structure connected to reservoir 52. The sample is then circulated through reaction chamber 55 by repeatedly actuating a linear actuator corresponding to pump structure 57. The sample is circulated continuously for a predetermined hybridization time typically from 30 minutes to 2 hours. The sample is then excluded from the circulation reservoir 56 and reaction chamber 55 by actuating pump structures 57 and 58 in opposing fashion. The first stringency wash buffer is then transferred to circulation reservoir 56 by repeatedly actuating the linear actuator corresponding to the pump structure connected to reservoir 51. The first stringency wash buffer is then circulated through reaction chamber 55 in the same manner described above. After a predetermined wash time, the first stringency wash buffer is excluded from reaction chamber 55 and circulation reservoir 56 as described above. A second stringency wash buffer is then transferred to circulation reservoir 56 and circulated through reaction chamber 55 in a manner similar to that previously described. After the second wash buffer is excluded, the DNA hybridization results can be read by fluorescent imaging.

The invention being thus described, it will be obvious that the-invention may be varied in many ways. Such variations are not to be regarded as a departure from the spirit and scope of the invention, and all such modifications as would be obvious to one skilled in the art are intended to be included within the scope of the following claims.

Figure 5A:
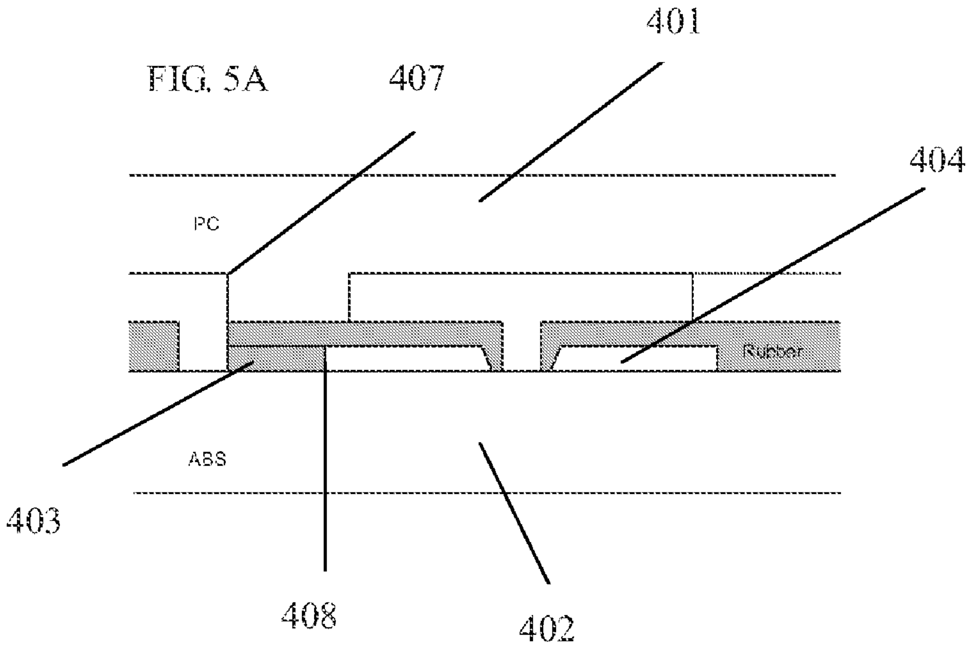
FIG. 5A is a cross-section diagram of an embodiment of the valve.

Next, referring to FIG. 5A, which is cross-section of an embodiment of the valve.

Here, a valve is designed such that compression of the rubber 403 due to the sealing process does not tend to open the valves but rather tends to close the valves. In this case achieving an effective seal and an operational valve would be mutually inclusive over a reasonable process range. The present invention describes such a valve structure that allows for consistent valve operation over a compression range of 30-100 microns.

Here the components of the valve are depicted. All critical alignment is placed within the same rubber part 403. Here the valve contains a lower cavity 404 in the rubber 403. This eliminates all alignment effects on valve performance. Specifically, touch point A 407 on upper substrate 401 and touch point B 408 on lower substrates 402 are offset in the direction of valve closure. Due to the offset of the touch points 407 and 408, when compressing the rubber 403 between the upper substrate 401 and lower substrate 402, a torque is created and the rubber 403 deforms in the direction of the outer touch point 408. The magnitude of the deforming force is influenced by the offset distance between the touch points 407 and 408. This will hold true until a critical compression point in the rubber when the valve seat inverts and buckles in the opposite direction.

Figure 5B:
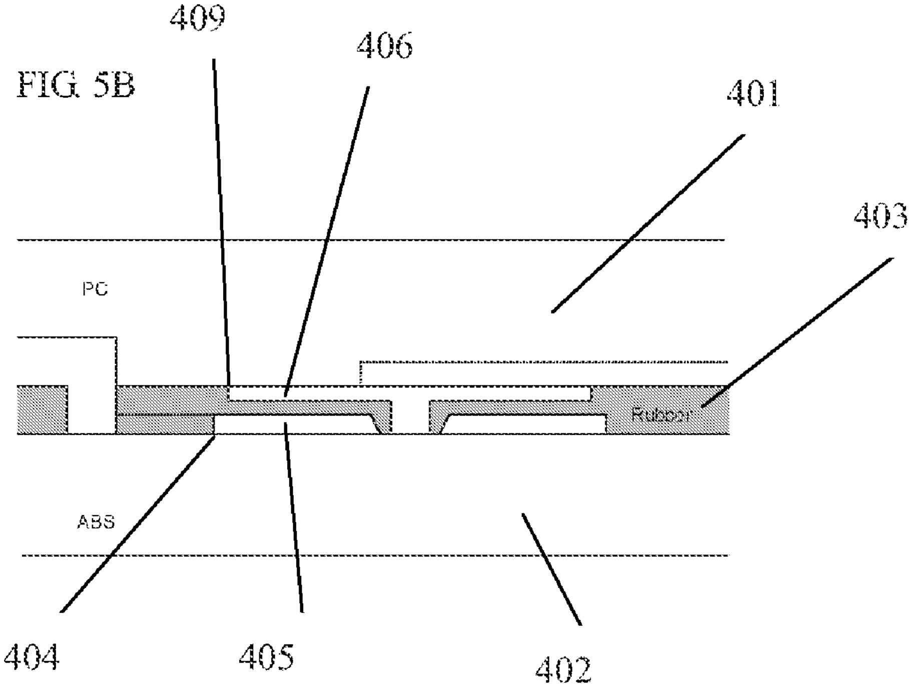
FIG. 5B is a cross-section diagram of another embodiment of the valve.

Next, referring to FIG. 5B, which is cross-section of another embodiment of the valve.

The present invention describes another embodiment of the valve structure that allows for consistent valve operation over a compression range of 30-100 microns. Here the components of the valve are depicted. All critical alignment is placed within the same rubber part 403. Here the valve contains a lower cavity 410 and an upper cavity 409 in the rubber 403. This eliminates all alignment effects on valve performance. Specifically, touch point A 409 on upper substrate 401 and touch point B 410 on lower substrates 402 are offset in the direction of valve closure. Due to the offset of the touch points 407 and 408, when compressing the rubber 403 between the upper substrate 401 and lower substrate 402, a torque is created and the rubber 403 deforms in the direction of the outer touch point 410. Again, the magnitude of the deforming force is influenced by the offset distance between the touch points 409 and 410. This will hold true until a critical compression point in the rubber when the valve seat inverts and buckles in the opposite direction.

What is claimed is:

1. A valve structure of a fluid delivery and analysis system, wherein said valve structure is comprised of an upper substrate, a lower substrate and an intermediate layer wherein said intermediate layer is comprised of at least one opening wherein said at least one opening extends from an upper surface of said intermediate layer through to a lower surface of said intermediate layer and at least one indented well wherein said at least one indented well has an opening end at said upper surface of said intermediate layer and a closed end at said lower surface of said intermediate layer or said at least one indented well has an opening end at said lower surface of said intermediate layer and a closed end at said upper surface of said intermediate layer wherein a first touch point is provided between said upper substrate and said intermediate layer and a second touch point is provided between said lower substrate and said intermediate layer wherein said first touch point and said second touch point are offset to create a torque when said intermediate layer is compressed between said upper substrate and said lower substrate wherein said torque deforms said intermediate layer in the direction of said at least one indented well.

2. The valve structure of claim 1 wherein said at least one indented well is located between said at least one opening and said first touch point and said second touch point.

3. A method to provide a valve structure of a fluid delivery and analysis system comprising: a. providing an upper substrate, b. providing a lower substrate, c. providing an intermediate layer in between said upper substrate and said lower substrate comprising at least one opening and at least one indented well wherein a first touch point is provided between said upper substrate and said intermediate layer and a second touch point is provided between said lower substrate and said intermediate layer wherein said first touch point and said second touch point are offset to create a torque when said intermediate layer is compressed between said upper substrate and said lower substrate wherein said torque deforms said intermediate layer in the direction of said at least one opening.

4. A method of claim 3 wherein said at least one indented well is located between said at least one opening and said first touch point and said second touch point.

* * * * *